(12) United States Patent
Horikawa et al.

(10) Patent No.: US 9,656,879 B2
(45) Date of Patent: May 23, 2017

(54) METHOD FOR TREATING TITANIUM-CONTAINING FEEDSTOCK

(71) Applicant: TOHO TITANIUM CO., LTD., Chigasaki-shi, Kanagawa (JP)

(72) Inventors: Matsuhide Horikawa, Chigasaki (JP); Eiichi Fukasawa, Chigasaki (JP)

(73) Assignee: TOHO TITANIUM CO., LTD., Chigasaki-shi, Kanagawa (JP)

( * ) Notice: Subject to any disclaimer, the term of this patent is extended or adjusted under 35 U.S.C. 154(b) by 0 days.

(21) Appl. No.: 14/429,588

(22) PCT Filed: Mar. 6, 2014

(86) PCT No.: PCT/JP2014/055815
§ 371 (c)(1),
(2) Date: Mar. 19, 2015

(87) PCT Pub. No.: WO2014/136890
PCT Pub. Date: Sep. 12, 2014

(65) Prior Publication Data
US 2016/0016812 A1   Jan. 21, 2016

(30) Foreign Application Priority Data

Mar. 6, 2013  (JP) ................................ 2013-044028

(51) Int. Cl.
*C01G 23/00* (2006.01)
*C01G 23/02* (2006.01)
(Continued)

(52) U.S. Cl.
CPC .............. *C01G 23/024* (2013.01); *B09B 3/00* (2013.01); *B09B 5/00* (2013.01); *C01B 7/035* (2013.01);
(Continued)

(58) Field of Classification Search
CPC .... C01G 23/022; C01G 23/024; C01G 49/02; B09B 3/00; C01B 7/035
(Continued)

(56) References Cited

U.S. PATENT DOCUMENTS

| 4,183,899 A | * | 1/1980 | Bonsack | ............. | C22B 34/1222 423/149 |
| 4,442,076 A | * | 4/1984 | Bonsack | ............. | C22B 34/1222 423/78 |
| 4,540,551 A | * | 9/1985 | Bonsack | ................ | C01G 49/06 423/74 |

FOREIGN PATENT DOCUMENTS

| CN | 101475210 A | 7/2009 |
| JP | 48-079195 A | 10/1973 |

(Continued)

OTHER PUBLICATIONS

Translation of JP 53-82613, Jul. 1978.*
(Continued)

*Primary Examiner* — Steven Bos
(74) *Attorney, Agent, or Firm* — Fitch, Even, Tabin & Flannery, LLP

(57) ABSTRACT

A method for producing titanium tetrachloride is provided, in which valuable materials such as unreacted titanium-containing raw material, carbon raw material and chlorine can be recovered from solid recovered material generated in chlorinating process of titanium-containing raw material, and titanium-containing raw material can be efficiently used. The treatment method of titanium-containing raw material includes the steps: separating and removing impurities selectively from the titanium-containing raw material as chlorides so as to obtain high titanium-containing raw material, producing titanium tetrachloride using the high titanium-containing raw material, and performing separating process of impurities from solid recovered material byproduced in the
(Continued)

production of titanium tetrachloride, together with selective chlorinating treatment of the titanium-containing raw material. Thus, the high titanium-containing raw material can be produced while recovering chlorine and impure oxides.

9 Claims, 3 Drawing Sheets

(51) Int. Cl.
    *B09B 3/00*     (2006.01)
    *B09B 5/00*     (2006.01)
    *C01G 49/02*     (2006.01)
    *C01G 49/10*     (2006.01)
    *C01B 7/03*     (2006.01)

(52) U.S. Cl.
    CPC ........... *C01G 23/022* (2013.01); *C01G 49/02* (2013.01); *C01G 49/10* (2013.01)

(58) Field of Classification Search
    USPC .......................... 423/493, 492, 79, 149, 632
    See application file for complete search history.

(56) References Cited

FOREIGN PATENT DOCUMENTS

| | | |
|---|---|---|
| JP | 62-007628 A | 7/1978 |
| JP | S5382613 A | 7/1978 |
| JP | 02-026828 A | 1/1990 |
| JP | 03-285820 A | 12/1991 |
| JP | 10-314697 A | 12/1998 |
| JP | 2005-015250 A | 1/2005 |
| JP | 2011-241339 A | 12/2011 |

OTHER PUBLICATIONS

International Search Report for International Application No. PCT/JP2014/055815 dated Jun. 10, 2014.

Office Action issued Nov. 18, 2015, by the State of Intellectual Property Office, P.R. China in regards to Appln. No. 201480002429.2 with English translation.

Office Action issued Jul. 13, 2016, by the State of Intellectual Property Office, P.R. China in regards to Appln. No. 201480002429.2.

* cited by examiner

METHOD FOR TREATING TITANIUM-CONTAINING FEEDSTOCK

TECHNICAL FIELD

The present invention relates to a method for efficiently treating byproduct generated in a production process for titanium tetrachloride, and in particular, relates to a method in which valuable material that can be recycled is efficiently recovered from the byproduct.

BACKGROUND ART

Titanium tetrachloride is produced by a chlorinating reaction of raw material containing titanium. The titanium-containing raw material contains a few percent of impurities such as iron or silicon in the form of oxides. Under the present circumstances, impure metal chlorides that are byproduced by chlorinating these impure oxides are treated as waste products.

These waste products are rendered harmless by washing with water, and they are separated into solid components and aqueous component. The solid component may be used as landfill material, and the aqueous component is treated as wastewater.

However, not only do the above treatments incur costs, but also titanium-rich raw material and carbon raw material, which are valuable as raw material for producing titanium tetrachloride and which are carried over while being unreacted, are contained in the solid component of the byproduct. Furthermore, chlorine, which is used in the chlorinating reaction of the titanium-containing raw material, is also contained in the form of chlorides. These valuable materials, such as unreacted raw material and chlorine components, are also wasted, and there is room for improvement from the viewpoints of cost reduction and environmental protection.

Regarding these viewpoints, Japanese Unexamined Patent Application Publication No. 2005-015250 discloses a technique in which chlorides of metals other than titanium byproduced in the production process of titanium tetrachloride and titanium metal are reacted at a high temperature so that the metal is recovered as a valuable material, and that chlorine in the metal chlorides is recovered as titanium chlorides.

However, in the above method, titanium chlorides, in which chlorine in the metal chlorides is fixed, require further treatment, and there is room for improving the cost and the process.

Furthermore, Japanese Unexamined Patent Application Publication Nos. 2011-241339 and Hei10 (1998)-314697 disclose a technique in which chlorine-containing waste product is heated so as to separate and remove chlorine gas and detoxify it, and then the product is burned and gasified.

However, these methods depend on the concept of combusting waste products, and it is necessary to treat chlorine gas generated during the process, and it is also necessary to treat other gas components during combustion. From the viewpoint of environmental protection of the Earth, there is room for improvement.

As is explained, a technique is required in which not only can recovered product byproduced in a production process for titanium tetrachloride be treated with an appropriate method so as to recover valuable material, but also, the valuable material, which can be recycled, can be recovered efficiently.

Furthermore, the price of high grade titanium raw material having a large content amount of titanium has been increasing, and as a countermeasure, a method is known in which a low grade titanium raw material having a small content amount of titanium is improved in quality to an appropriate grade (improving titanium concentration) so as to obtain high titanium-containing raw material, and thereby producing titanium tetrachloride by using this. However, also in this case, impure chlorides which are derived from the low grade titanium raw material are byproduced during a cooling process for exhaust gas, and these chlorides are also processed as a waste product, the amount of the waste product has tended to increase with increasing amounts of the low grade titanium raw material used. Thus, improvements for these problems are necessary.

SUMMARY OF THE INVENTION

An object of the present invention is to provide a method for producing titanium tetrachloride in which valuable materials such as unreacted titanium-containing raw material, carbon raw material and chlorine can be recovered from byproduct generated in a chlorinating process for titanium-containing raw material, and low grade titanium raw material can be efficiently used.

The inventors have researched to solve these problems in view of the above circumstances, and they found that not only can titanium-containing raw material be improved in quality by reusing recovered solid material generated during production processes for titanium tetrachloride as a raw material for quality improving processing of the titanium-containing raw material, but also chlorine, which is a valuable material, can be efficiently recovered from the waste product, and furthermore, unreacted titanium raw material contained in the recovered solid material can also be recovered, and thereby, reusing them as a raw material for producing titanium tetrachloride, and thus, the present invention was completed.

That is, the treatment method for titanium-containing raw material includes the following steps: separating and removing impurities selectively from the titanium-containing raw material as chlorides (hereinafter referred to as "selective chlorinating treatment"), producing titanium tetrachloride using a high titanium-containing raw material produced in the selective chlorinating treatment, and performing separating processes for impurities from solid recovered material byproduced in the production of titanium tetrachloride, together with the selective chlorinating treatment for the titanium-containing raw material.

In the treatment method for titanium-containing raw material of the present invention, it is desirable that the titanium-containing raw material be titanium slag which was obtained by carbon reduction of ilmenite ore, ilmenite ore, or anatase ore.

In the treatment method for titanium-containing raw material of the present invention, it is desirable that the solid recovered material byproduced during the production of titanium tetrachloride using the high titanium-containing raw material be a mixture containing unreacted raw materials and impure chlorides that are discharged from the chlorinating furnace.

In the treatment method for titanium-containing raw material of the present invention, it is desirable that before performing the selective chlorinating treatment of a mixture in which the titanium-containing raw material is added to the solid recovered material byproduced during the production of titanium tetrachloride using the high titanium-containing raw material, the impure chlorides in the solid recovered material are vaporized and removed by heating the mixture together.

In the treatment method for titanium-containing raw material of the present invention, it is desirable that chlorine be reacted with the mixture containing the solid recovered material in which impure chlorides are already vaporized and removed and unreacted raw materials are present, so that other impurities in the solid recovered material will be separated and removed as chlorides.

In the treatment method for titanium-containing raw material of the present invention, it is desirable that the impure chlorides separated and removed by the method be oxidized so that impure oxides are recovered.

In the treatment method for titanium-containing raw material of the present invention, it is desirable that the chlorine recovered by the method be reused as a chlorine source for the selective chlorinating treatment of the mixture and for production of titanium tetrachloride using titanium-containing raw material.

In the treatment method for titanium-containing raw material of the present invention, it is desirable that the content amount of titanium dioxide in the high titanium-containing raw material be 92 weight % or more.

According to the method of the present invention, not only the high titanium-containing raw material and carbon material that are carried over while being unreacted, and which are treated as a waste product conventionally, can be efficiently separated and recovered, but chlorine can also be separated and recovered from impure chlorides in the solid recovered material.

Furthermore, by performing the selective chlorinating treatment together with the titanium-containing raw material and the solid recovered material generated during the production process of titanium tetrachloride using high titanium-containing raw material, the titanium-containing raw material can be improved in quality and the impure metal oxides in the titanium-containing raw material can be recovered at the same time.

Furthermore, an effect can also be obtained in which high titanium raw material, which is improved in quality from the titanium-containing raw material, can be efficiently reused as raw material of titanium tetrachloride.

Ultimately, among raw materials supplied to the titanium-containing raw material treatment system, most of titanium ore, carbon raw material and chlorine component are consumed or recycled, and only impure oxides are discharged from the system.

MODE FOR CARRYING OUT THE INVENTION

Hereinafter, one of the superior Embodiments of the present invention is explained with reference to the drawings.

The treatment method for titanium-containing raw material of the present invention includes a titanium tetrachloride production process in which high titanium-containing raw material containing titanium at a specific concentration or more is chlorinated in the presence of carbon raw material so as to generate titanium tetrachloride, and a recovering process that is connected at the downstream side of the titanium tetrachloride production process and which recovers solid material byproduced at the titanium tetrachloride production process, and further includes a quality improving process in which titanium-containing raw material having lower titanium concentration compared to the high titanium-containing raw material is improved in quality, parallel to the above two processes which are connected serially. It is characterized in that the solid recovered material recovered in the recovering process is used in the quality improving process together with titanium-containing raw material.

A-1. Titanium Tetrachloride Production Process

The titanium tetrachloride production process of the present invention is a process in which titanium ore and carbon raw material are used as raw materials, chlorine gas is reacted with them at a high temperature so as to produce titanium tetrachloride as shown in FIG. 1A, that is, a titanium tetrachloride production process by a conventional chlorinating method.

Figure 1:
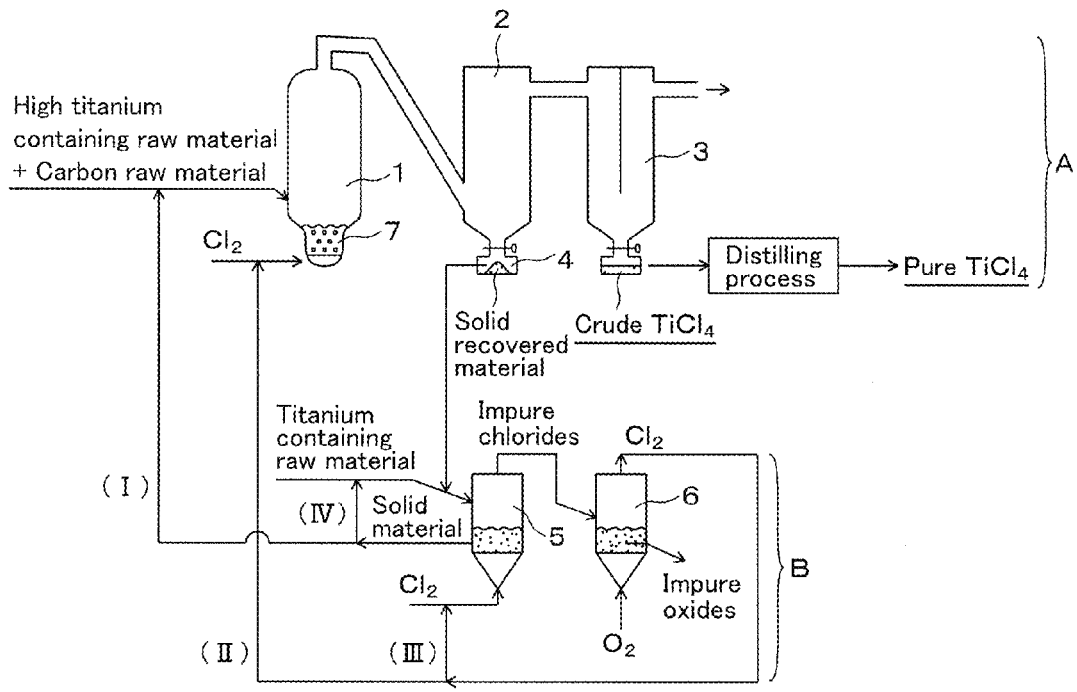
FIG. 1 is a conceptual diagram showing an Embodiment of titanium tetrachloride production process A and quality improving process B of titanium component containing raw material of the present invention.

At the bottom part of a chlorinating furnace 1 shown in FIG. 1, a fluidized layer 7 including titanium ore and carbon raw material is formed, and the temperature thereof is maintained at 900 to 1000° C. This fluidized layer 7 is fluidized by chlorine gas introduced from the bottom part. The ore and carbon raw material contained in the fluidized layer 7 are reacted so as to generate titanium tetrachloride gas, while metal such as iron or manganese contained in the ore is also chlorinated.

A-2. Recovery Process

In this way, titanium tetrachloride gas together with impure chlorides gas byproduced are introduced to a cooling device 2 arranged at the downstream side of the chlorinating furnace 1. Among titanium tetrachloride gas and impure metal chloride gas introduced to the cooling device 2, most of the impure metal chlorides gas is condensed by being liquefied or solidified, and it precipitates and is recovered in a recovery vessel 4, so as to be separated from titanium tetrachloride gas.

Furthermore, due to chlorine gas that flowed into the chlorinating furnace 1 and titanium tetrachloride gas generated, ore and carbon raw material in the form of fine powder which remain without completing reaction are carried over from the fluidized layer 7 of the chlorinating furnace 1 while being unreacted, and these are also carried to the cooling device 2 together and are collected as solid recovered material in the recovery vessel 4.

Titanium tetrachloride gas from which impure metal chlorides gas and unreacted fine powder ore and carbon raw material are separated and removed is introduced into a titanium tetrachloride recovery device 3 arranged at the downstream side of the cooling device 2 and is recovered as liquid titanium tetrachloride in a vessel arranged at the bottom thereof.

The liquid titanium tetrachloride recovered (this titanium tetrachloride may be referred to as "crude titanium tetrachloride" since it still contains impurities) is purified in a purifying process, so as to obtain highly pure titanium tetrachloride.

B-1. Quality Improving Process

Among the abovementioned processes, solid material including impure metal chlorides, fine powder titanium-containing raw material and fine powder carbon raw material (hereinafter referred to as "solid recovered material" as shown in FIG. 1) was conventionally treated as an industrial waste material; however, in the present invention, it is characterized in that the solid recovered material is used as a raw material in the quality improving process of titanium-containing raw material.

The term "titanium-containing raw material" here is not defined definitely its value range of content ratio, but, for example, compared to a high titanium-containing raw material containing 40% or more of titanium oxide and having low content amount of impurities, and it instead means material having lower titanium oxide content amount than that of the high titanium-containing raw material, that is, 40 to 90%, such as ilmenite, titanium slag or the like.

The quality improving process for titanium-containing raw material means a general process for improving in quality, in which concentration of impurities is reduced and content amount of titanium is improved using titanium-containing raw material as a starting material.

B-2. Selective Chlorinating Process

A process shown as B in FIG. 1 indicates the quality improving process of the titanium-containing raw material.

The quality improving process is a so-called selective chlorinating method, and one example thereof is shown.

The selective chlorinating method means that metal oxides (primarily iron) contained in the titanium-containing raw material is selectively chlorinated and separated so as to improve titanium purity of the titanium-containing raw material.

The solid recovered material from the recovering vessel 4 and titanium-containing raw material and carbon raw material are supplied to a selective chlorinating furnace 5. Furthermore, chlorine gas is supplied from the bottom part of the chlorinating furnace 5 so as to perform selective chlorinating.

In the abovementioned titanium tetrachloride production process, since coke is supplied in addition to titanium oxide and impure metal oxides in titanium ore in the chlorinating furnace 1 maintained at 900 to 1000° C., both titanium oxide and impure metal oxides are chlorinated. On the other hand, since coke does not exist in the chlorinating furnace 5 in the selective chlorinating, the titanium component remains in the titanium-containing raw material in the form of titanium oxide in this temperature condition, and only impure metal oxides are chlorinated.

In the present invention, it is characterized in that not only quality improving treatment process of the above titanium-containing raw material is merely performed singularly, but also solid recovered material recovered during the above titanium tetrachloride production process and the recovering process (cooling device 2) is added to the titanium-containing raw material used in the quality improving process, so as to perform selective chlorinating together.

By performing selective chlorinating under the abovementioned aspect, impure metal oxides contained in unreacted fine powder titanium-containing raw material (derived from high titanium-containing raw material) contained in solid recovered material byproduced in the titanium tetrachloride production process can be separated and removed as metal chloride thereof, and as a result, purity of both solid recovered material and titanium-containing raw material can be increased together.

The titanium-containing raw material that is improved in quality in this way is recycled as a high titanium-containing raw material in the titanium tetrachloride production process as shown in the path (I) of FIG. 1.

B-3. Oxidizing and Roasting Process

In the present invention, it is desirable that impure metal chlorides that are byproduced in the selective chlorinating process of titanium-containing raw material in the selective chlorinating furnace 5 in the quality improving process of titanium-containing raw material and metal chlorides which are contained in solid recovered material, be continuously introduced from the selective chlorinating furnace 5 to an oxidizing and roasting furnace 6 (oxidizing and roasting process) which is arranged downstream of the selective chlorinating furnace 5 in gas phase.

In the oxidizing and roasting process, oxygen is supplied to impure chlorides that are introduced from the chlorinating furnace 5 of the upstream in the oxidizing and roasting furnace 6, so that the impure chlorides become impure oxides by oxidation, while byproducing chlorine gas.

Chlorine gas generated in the oxidizing and roasting process is supplied to the chlorinating furnace 1 of the titanium tetrachloride production process as shown in the path (II) of FIG. 1, thereby recycling chlorine gas as a chlorinating agent of high titanium-containing raw material. As a result, specific chlorine consumption in production of titanium tetrachloride can be reduced.

Furthermore, chlorine gas generated in the oxidizing and roasting process can also be used as a chlorinating agent in the selective chlorinating process of titanium-containing raw material as shown in the path (III) of FIG. 1. In this way, the chlorine component contained in solid recovered material byproduced in the titanium tetrachloride production process can be efficiently recovered as chlorine gas.

Figure 2:
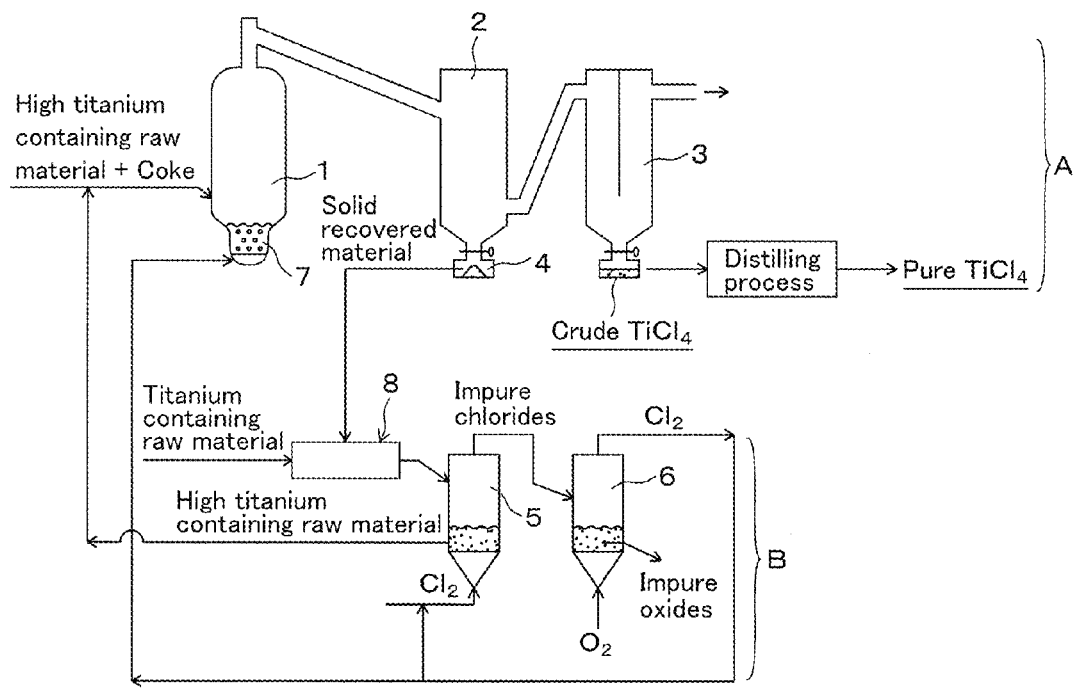
FIG. 2 is a conceptual diagram showing an Embodiment of titanium tetrachloride production process A and quality improving process B of titanium component containing raw material of the present invention.

FIG. 2 shows another preferred Embodiment of the present invention. In this Embodiment, it is desirable that a mixture in which solid recovered material recovered in the recovery vessel 4 shown in FIG. 2 is added to titanium-containing raw material and is heated to a high temperature in heating furnace 8 before supplying it to the selective chlorinating furnace 5.

By performing the heating treatment before the selective chlorinating, powder solid chlorides contained in the mixture can be converted into gas, and as a result, the selective chlorinating reaction in the selective chlorinating furnace 5 can be thermally advantageously performed.

Furthermore, fine powder high titanium-containing raw material contained in the solid recovered material, which is carried over from the chlorinating furnace 1, can be sintered, and fine powder high titanium-containing raw material can be sintered on the surface of titanium-containing raw material. As a result, the selective chlorinating process or the oxidizing and roasting process, which is arranged at downstream thereof, can be smoothly performed. Therefore, it is desirable that the temperature of the heating furnace 8 be set in a range of 400 to 1000° C.

Furthermore, in the present invention, accompanied by continuing raw material supply and reaction, silica and calcium chloride, which are difficult to react with chlorine gas, have a tendency to deposit in the fluidized layer including titanium-containing raw material and carbon raw material. In a case in which this is left as it is, contact efficiency of chlorine gas and titanium ore may be decreased, and as a result, there may be a problem in that supply rate of chlorine gas cannot be increased.

Therefore, in an actual production site, in order to remove deposited silica and calcium chloride, a part of the raw material containing titanium ore and carbon raw material is discharged with regularity from the fluidized layer formed at the bottom of chlorinating furnace 1, and this discharged raw material is also treated as waste material.

Figure 3:
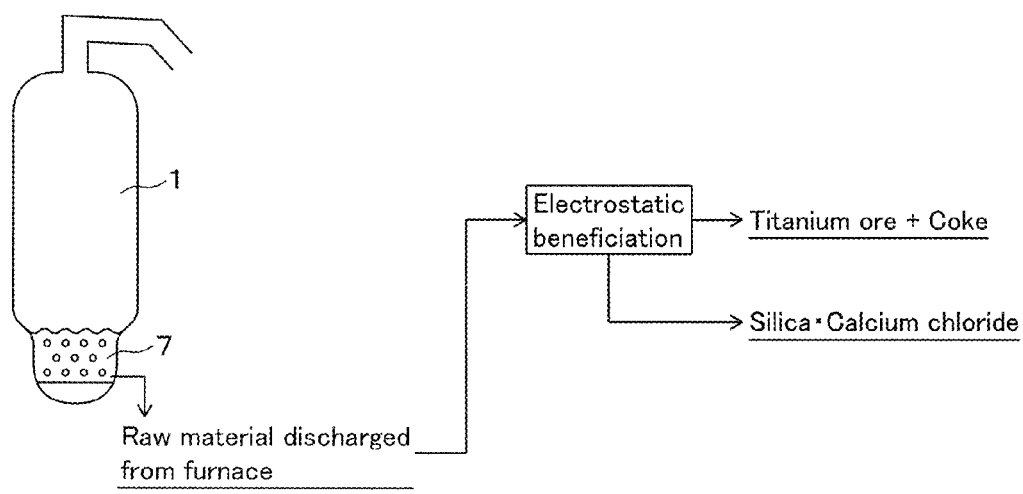
FIG. 3 is a conceptual diagram showing a part changed in another Embodiment of the present invention.

In the present invention, as shown in FIG. 3, it is desirable that the silica and calcium chloride be removed from unreacted titanium-containing raw material and carbon raw material by performing electrostatic beneficiation of the material discharged from the furnace, and the unreacted titanium-containing raw material and carbon raw material which are separated are used as raw material in the quality improving process of titanium-containing raw material.

By performing the abovementioned electrostatic beneficiation, titanium-containing raw material can be recovered from the discharged raw material which has been conventionally treated as a waste material, this titanium raw material can be further improved in quality, and this can be recycled as raw material for production of titanium tetrachloride. Furthermore, since titanium-containing raw material is improved in quality, the amount of solid recovered material which may be byproduced in the production process of titanium tetrachloride can be reduced using this improved quality titanium-containing raw material.

In the present invention, it is desirable that high grade titanium-containing raw material, which is obtained by treating in the quality improving process of titanium-containing raw material, be recycled again in the quality improving process as a raw material to be processed, as shown in the path (IV) of FIG. 1.

In addition, by repeating the quality improving process for titanium-containing raw material multiple times, the content ratio of titanium oxide in titanium-containing raw material can be effectively increased.

The impure oxides which are byproduced in the oxidizing and roasting furnace 6 in the oxidizing and roasting process contain iron oxide, silicon oxide, calcium oxide and the like as a main component, and therefore, it is harmless if it is wasted as it is; however, it can be effectively used as ceramic material, road base material, or cement material.

Figure 4A:
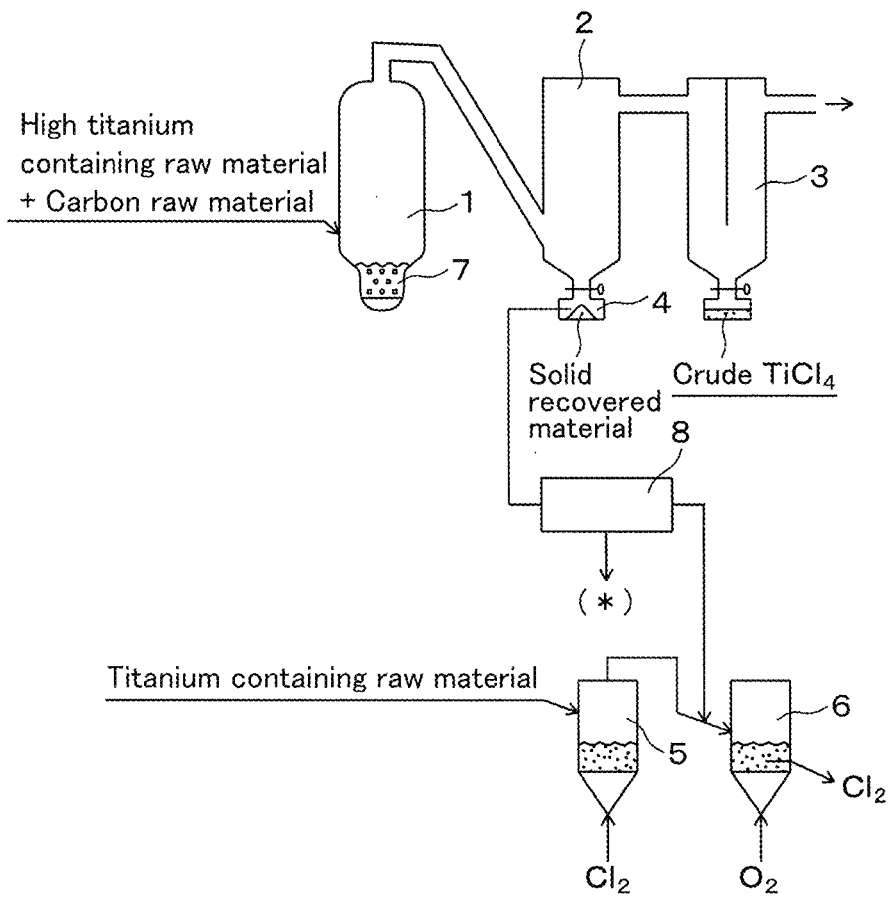
FIGS. 4A and 4B are conceptual diagrams showing a part changed in another Embodiment of the present invention.
Figure 4B:
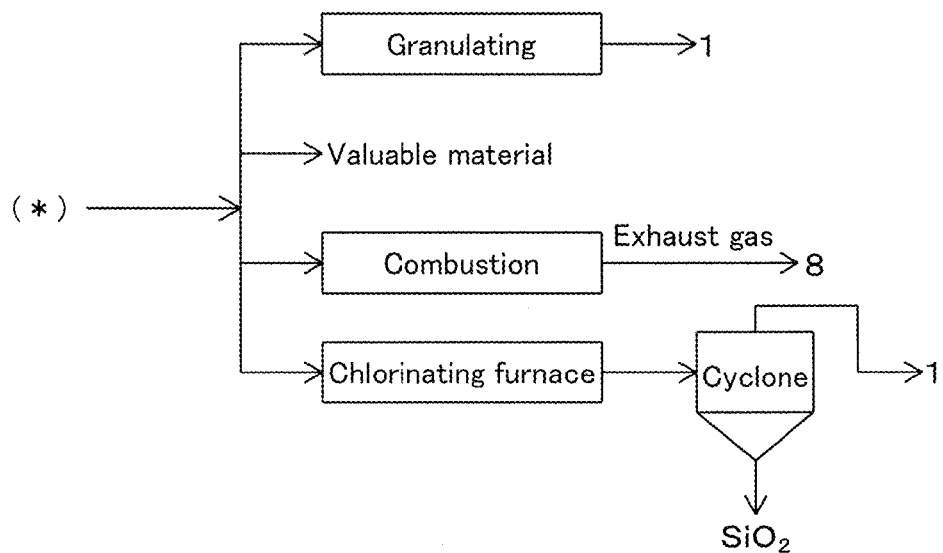

FIGS. 4A and 4B show another desirable Embodiment of the present invention. In this Embodiment, as shown in FIG. 4A, it is desirable that high titanium-containing raw material and carbon raw material is supplied to the chlorinating furnace 1 so as to generate titanium tetrachloride, metal chloride and solid material containing titanium tetrachloride are caused to flow to the cooling device 2, the solid recovered material is collected in the vessel 4, at least a part of the solid recovered material is supplied to the heating furnace 8, and residue remaining in the heating furnace (hereinafter referred to as "heated residue" and indicated by "*") is processed by at least one of the following four treatments.

1) The heated residue is granulated and brought back to the chlorinating furnace 1.
2) The heated residue is made into a valuable material (it is sold as it is as a combustion improver of cement or the like).
3) The heated residue is reacted with oxygen gas or air, and the exhaust gas generated is returned to the heating furnace 8 so as to be used as a heat source.
4) The heated residue is supplied to a small chlorinating furnace and is reacted with chlorine gas so as to generate titanium tetrachloride, and this is returned to the cooling device 2 arranged downstream of the chlorinating furnace 1, and recovered as titanium tetrachloride. Silicon oxide contained in the heated residue is preliminarily separated from titanium tetrachloride by arranging a cyclone downstream of the small chlorinating furnace.

By performing at least one of the abovementioned treatments 1) to 4), chlorine gas and titanium component contained in the solid recovered material recovered in the cooling device 2 arranged downstream of the chlorinating furnace 1 can be efficiently recovered.

It should be noted that granulation of the heated residue (1) can be efficiently performed by using a tumbling granulator, agitating granulator or the like and by using liquid glass or polyvinyl alcohol as a binder.

Furthermore, chloride gas which is gasified in the heating furnace 8 is introduced to the oxidizing and roasting furnace 6 with metal chloride gas generated in the selective chlorinating furnace of titanium-containing raw material, thereby enabling recovery of chlorine component in the metal chlorides as chlorine gas. The chlorine gas recovered can be used as a chlorinating agent in the chlorinating furnace 1 and the selective chlorinating furnace 5.

EXAMPLES

Hereinafter, the present invention is further explained in detail by way of Examples and Comparative Examples. The common conditions in the Examples are as follows.
1) Titanium-containing raw material (titanium slag)
   $TiO_2$ grade: 85%
   Particle diameter: 150 μm to 300 μm
2) Carbon raw material (coke)
   Carbon purity: 98%
   Particle diameter: 500 μm to 1000 μm
3) Solid recovered material (waste material, unreacted titanium-containing raw material)
   Component: ore (5 wt %), carbon raw material (30 wt %), chlorides (50 wt %), other (15 wt %)
   Average particle diameter: 50 μm
4) Oxygen gas
   Purity: 99.99%
   Formation: bottled gas
5) Heating conditions of impure chlorides (waste material)
   Atmosphere: inert gas
   Temperature: 1000° C.
6) Oxidizing and roasting of chlorides
   Roasting temperature: 500° C. to 700° C.
   Atmosphere: oxygen gas atmosphere Example 1

According to a flow chart diagram of devices shown in FIG. 1, a mixture consisting of solid recovered material which was recovered in the cooling system of the chlorinating furnace for production of titanium tetrachloride, and titanium slag was supplied in the selective chlorinating furnace 5 so that selective chlorinating of titanium slag in the mixture was performed and iron oxide, which is a main impurity in titanium slag, was separated and removed as iron chloride.

The iron chloride which was separated and removed from titanium slag was oxidized and roasted in the oxidizing and roasting furnace 6 which was arranged at the next step, so that chlorine gas was recovered from iron chloride and the chlorine gas was reused as a chlorinating agent of the chlorinating furnace 1 and the selective chlorinating furnace 5.

On the other hand, high titanium-containing raw material in which purity of titanium oxide was increased by selective chlorinating was supplied to the chlorinating furnace 1 so as to produce titanium tetrachloride.

As a result, in a case in which the amount of chlorine that was conventionally wasted as impure chlorides was assumed to be 100, the recovered ratio of chlorine in this Example was more than 90%. Furthermore, by recycling each recovered raw material in the chlorinating furnace for producing titanium tetrachloride, specific consumptions of titanium-containing raw material and coke were improved about 5% each.

Example 2

According to a flow chart diagram of devices shown in FIG. 2, the quality improving treatment of titanium-containing raw material was performed in a manner similar to that in Example 1, except that a mixture consisting of solid recovered material which was recovered in the cooling system of the chlorinating furnace for production of titanium tetrachloride, and titanium slag was heated at 700° C. to vaporize impure chlorides in the solid recovered material, and the mixture from which chlorides were vaporized was supplied in the selective chlorinating furnace 5.

It was confirmed that titanium oxide grade in the high titanium-containing raw material obtained by this quality improving treatment was improved up to 95%.

As a result, in a case in which the amount of chlorine which was conventionally wasted as impure chlorides was assumed to be 100, the recovered ratio of chlorine as impure chlorides in this Example was 99%.

Furthermore, of the impure chlorides that were conventionally treated as a waste material, 80% can be recovered as oxide of impure metal.

Furthermore, 80% of coke that was conventionally treated as a waste material was recovered. The coke recovered was recycled as a raw material for producing titanium tetrachloride, and specific consumption of coke was improved at the amount.

Example 3

Except that titanium slag in the form of fine powder that was sifted from larger titanium slag and cut was added to solid component of Example 1, it was recycled as a raw material for chlorinating for production of titanium tetrachloride in the same conditions as in Example 1. As a result, specific consumption of titanium slag was further improved 2.5% compared to Example 1.

Example 4

In Example 1, raw material that was discharged from the chlorinating furnace for production of titanium tetrachloride in the purpose of controlling components in the furnace was treated in an electrostatic separator so as to separate titanium ore and coke in the discharged raw material, and they were recycled in the chlorinating furnace for production of titanium tetrachloride. As a result, specific consumption of ore was further improved 4% compared to Example 1.

Comparative Example 1

Solid recovered material as it was of Example 1 was washed with water and was neutralized, and the solid component and waste liquid were treated. Loss of raw material and chlorine gas during the process cancelled the improvement in Example 1.

Because titanium-containing raw material can be efficiently used in the present invention, production cost of titanium tetrachloride can be efficiently improved. Furthermore, because valuable materials can be efficiently recovered from solid recovered material, which has been conventionally a problem, and final solid material can be made harmless and minimized, the present invention is advantageous from the viewpoint of environmental impact.

EXPLANATION OF REFERENCE NUMERALS

A: Process for production of titanium tetrachloride, B: quality improving process, 1: chlorinating furnace, 2: cooling device, 3: titanium tetrachloride recovering device, 4: solid recovered material recovery vessel, 5: selective chlorinating furnace, 6: oxidizing and roasting furnace, 7: fluidized layer, and 8: heating furnace.

The invention claimed is:

1. A treatment method for titanium-containing raw material, comprising steps of:
    a first chlorinating process comprising producing titanium tetrachloride from a first titanium-containing raw material, wherein the first titanium-containing raw material is a high titanium-containing raw material, and wherein the first chlorinating process produces a byproduced material;
    recovering the byproduced material as a solid;
    a second chlorinating process comprising exposing a second titanium-containing raw material to chlorine in the presence of the recovered solid byproduced material, the second titanium-containing raw material comprising impure metals; and
    separating impure metals selectively chlorinated during exposure of the second titanium-containing raw material to chlorine in the presence of the recovered solid byproduced material from the second titanium-containing raw material.

2. The treatment method for titanium-containing raw material according to claim 1, wherein the second titanium-containing raw material is titanium slag which is obtained by carbon reduction of ilmenite ore, or anatase ore.

3. The treatment method for titanium-containing raw material according to claim 1, wherein the recovered solid byproduced material comprises: unreacted raw carbon, ore and impure metal chlorides.

4. The treatment method for titanium-containing raw material according to claim 1,
    wherein the recovered solid byproduced material comprises impure metal chlorides, and
    further comprising:
        before performing the second chlorinating process creating a mixture of the second titanium-containing raw material and the recovered solid byproduced material by adding the second titanium-containing raw material to the recovered solid byproduced material; and
        before performing the second chlorinating process vaporizing and removing the impure metal chlorides in the recovered solid byproduced material by heating the mixture.

5. The treatment method for titanium-containing raw material according to claim 1,
    wherein the recovered solid byproduced material comprises impure metal oxides and impure metal chlorides, and
    further comprising:
        vaporizing and removing the impure metal chlorides in the recovered solid byproduced material prior to the second chlorination process; and
        mixing the recovered solid byproduced material with the titanium-containing raw material prior to the second chlorination process; and during the second chlorination process separating and removing the impure metal oxides in the recovered solid byproduced material as metal chlorides.

6. The treatment method for titanium-containing raw material according to claim 1 further comprising:
oxidizing the separated impure metals selectively chlorinated to impure metal oxides; and
recovering the impure metal oxides.

7. The treatment method for titanium-containing raw material according to claim 1, further comprising:
immediately after recovering the solid byproduced material, creating a heated residue by heating at least a part of the recovered solid byproduced material; and
treating the heated residue by at least one of the following processes:
1) granulating the heated residue of the recovered solid byproduced material and supplying the granulated heated residue to a chlorinating furnace:
2) recovering the heated residue of the recovered solid byproduced material for use as a valuable material;
3) a heating process comprising:
generating heat by reacting the heated residue of the recovered solid material with an added oxidizing agent and delivering the generated heat to a heating process;
4) a third chlorination process wherein the heated residue of the recovered solid byproduced material comprises titanium ore, the third chlorination process comprising:
generating titanium tetrachloride from the titanium ore by reacting the heated residue of the recovered solid byproduced material with chlorine; and
recovering the titanium tetrachloride.

8. The treatment method for titanium-containing raw material according to claim 6, wherein the oxidation of the separated impure metals selectively chlorinated produces chlorine, and further comprising:
recovering the produced chlorine;
delivering a first portion of the recovered chlorine to the first chlorinating process; and
delivering a second portion of recovered chlorine to the second chlorinating process.

9. The treatment method for titanium-containing raw material according to claim 1, wherein the first titanium-containing raw material has a content of titanium dioxide of 92 weight % or more.

* * * * *